United States Patent Office 3,637,650
Patented Jan. 25, 1972

3,637,650
OXIDATION OF BIUREAS TO
AZOBISFORMAMIDES
Arthur Doering, Middlesex, N.J., assignor to American
Cyanamid Company, Stamford, Conn.
No Drawing. Filed Aug. 12, 1969, Ser. No. 849,510
Int. Cl. C07c 107/00; C09b 27/00
U.S. Cl. 260—192                                6 Claims

ABSTRACT OF THE DISCLOSURE

Biureas are oxidized to azoamides, as a slurry in acetonitrile or aqueous acetonitrile, or other 2 to 6 carbon fatty acid nitrile, by heating in the presence of a 5 to 10% stoichiometric excess of concentrated nitric acid. Acetonitrile may be recovered from the reaction mixture simultaneously by distillation. For example, 1,6-di(n-butyl)biurea is oxidized to 1,1'-azobis(N-n-butylformamide).

SUMMARY

This invention relates to the manufacture of azo compounds by oxidation of the corresponding biureas, using nitric acid in lower fatty acid nitrile slurries, preferably acetonitrile, which may contain up to 70% water.

The manufacture of azo compounds of the formula

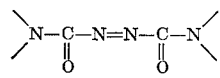       I from corresponding biureas containing the grouping

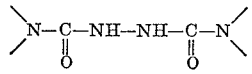       II has been previously described. Among such methods are:

(1) Elemental oxygen and a nitrogen oxide in an organic acid—U.S. 3,192,196, Vidal and Sarli.
(2) An inorganic nitrate, preferably ammonium nitrate, in acetic acid using a copper catalyst, such as copper acetate—U.S. 3,017,406, Mehr.
(3) Chlorine in a non-alkaline medium in the presence of catalytic amounts of bromine or a bromide—U.S. 3,190,873, Porter.
(4) An alkali metal chlorate plus a vanadium compound—U.S. 3,227,706, Binzer.
(5) An alkali metal chromate in an aqueous slurry containing sulfuric acid—U.S. 2,988,545, Hill.
(6) Hypochlorous acid—E.C. Horning, Organic Syntheses, Collective volume 3, John Wiley & Sons, New York, 1955, at page 375 (there named as ethyl azodicarboxylate and formic acid, azodi-, diethyl ester).
(7) Concentrated nitric acid or combinations of concentrated nitric acid and fuming nitric acid—Ingold and Weaver, J. Chem. Soc. 127, 381 (1925); Curtius and Heindenreich, Ber. 27, 774 (1894); Diels and Fritzsche, Ber. 44, 3018 (1911).

New and more economical methods of accomplishing the oxidation are in demend even though, as shown by (7) the use of nitric acid for the oxidation of biurea compounds has been described.

It has been found that the biureas represented by the Formula III

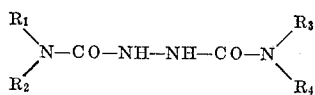   III are oxidized to produce the corresponding azobisformamide having the formula IV

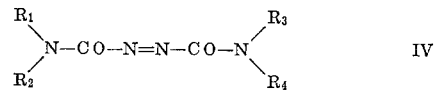   IV in which $R_1$, $R_2$, $R_3$, and $R_4$ are selected from the group consisting of hydrogen, alkyl of 1 to 12 carbon atoms, mono- and dicarbocyclic aryl and substituted aryl, cycloalkyl, aralkyl, alkoxyalkyl, cyanoalkyl, haloalkyl, nitronlkyl, alkenyl, and $R_1$ and $R_2$ and/or $R_3$ and $R_4$, when akyl may be joined directly or through a nitrogen, sulfur or oxygen atom to form a heterocyclic ring by forming a slurry of the biurea in a liquid fatty acid nitrile having from 2 to 5 carbon atoms, and having present not more than 70% water by weight, in the presence of a 5 to 15% stoichiometric excess of nitric acid, and heating to oxidize the biurea to the azobisformamide; and preferably simultaneously recovering the acetonitrile from the reaction mixture by distillation.

Compounds having more than one hydrazo linkage, for example, bridged hydrazo compounds having a bridging linkage uniting several hydrazo moieties may be oxidized to the corresponding azo compounds.

Whereas pure biureas may be used as starting materials, biureas containing water or even synthesis mixtures in which the biureas are formed may be used as starting materials. Mixtures of biureas, or bridged biureas, i.e., compounds in which bridges link moieties having more than one hydrazo linkage may be used. Usually reasonably pure starting materials of a single compound are used to give a single product, with the purity actually being upgraded during the reaction, and associated washing.

The present process is particularly advantageous because:

(a) It uses inexpensive and readily available reagents.
(b) It uses a non-oxidizable, polar, low boiling organic solvent that is not nitrated, and which is readily recoverable for reuse.
(c) Hydrolysis of the azobisformamide is low.
(d) The oxidation is fast, at economical temperatures.
(e) The yield and purity are excellent.
(f) The process is economical both as a batch and a continuous process.

Among the biureas which give good yields are biurea (hydrazobisformamide), 1,6 - dimethylbiurea, 1,6 - di(n-butyl)biurea, 1,6-di(n-amyl)biurea, and 1,6-(cyclohexyl) biurea.

Acetonitrile is a low cost, non-oxidizable, non-nitratable, polar, low boiling organic solvent and is preferred because of low cost and ready availability. Other lower alkyl nitriles, such as propionitrile, butyronitrile, and valeronitrile, here classed as called lower fatty acid nitriles, give good results.

The oxidation of the biureas does not proceed to any significant extent in water, in the absence of the said nitrile solvent. The concentration of acetonitrile is at least about 30% by weight in water for good efficiency. Higher concentrations are useful and a concentration of about 50%–75% by weight is preferred. The oxidation is effective in anhydrous acetonitrile, indeed even at lower temperatures, but solvent recovery for reuse is easier if only concentrated to about 50% to 75% nitrile in water.

Generally the biureas are not soluble in the nitrile system at room temperature, so a slurry is formed. Up to about 40 parts of the biurea per 100 parts of solvent by weight is readily manageable as a slurry at room temperature. More concentrated systems can be used at the loss of ease of handling. The slurry can be dilute, even to the point of solubility when warm. Larger quantities of the solvent increase the batch size, and quantity of throughput, but give good results.

The concentrated nitric acid, available as 70% or in other commercially available concentration, is preferably added at room temperature, with about 2% to 100% stoichiometric excess of nitric acid being used. Economically, 5% insures an adequate excess, and over 15% increases the nitric acid cost.

The process can be either batch, or continuous. In batch operations, foaming can be a problem, with antifoam agents added as expedient. Anhydrous acetonitrile tends to reduce foaming. In batch operation, the rate can be controlled by heating until nitric oxide is evolved:

3—CO—NH—NH—CO—+2HNO$_3$→
    3—CO—N=N—CO—+2NO+4H$_2$O with the rate of temperature rise being used to control the rate of reaction. In anhydrous acetonitrile, the reaction starts as low as 20° C. With water present from the solvent, acid, or starting materials, temperatures of up to 90° C. can be used to drive the reaction to completion.

The product is generally less soluble than the starting biurea, and can be isolated directly by filtration, or centrifugation with water washing, or the acetonitrile may be distilled from the slurry, and the product azobisformamide isolated from the residual slurry, with water washing, and drying.

For larger scale operations, a continuous system is preferred. A particularly useful method for conducting the reaction is by the use of a rotary thin-film evaporator, such as the Artisan Rototherm E evaporator, marketed by Artisan Industries, Inc. Such a device operates on the turbulent film principle. A feed stream entering the unit is thrown by centrifugal force against a heated process wall to form a turbulent film between the wall and the rotor blade tips. The film covers the entire process wall (jacketed surface) at all times regardless of the evaporation rate. Contact time is controlled by feed rate and size of reactor.

In an apparatus such as described a slurry of the biurea compound in aqueous acetonitrile containing the nitric acid is fed into the heated process chamber, where it is thrown against the heated process wall by rotating blades. As the slurry heats up, the oxidation occurs and the acetonitrile and nitric oxide vapors are removed by distillation. The azo compound is collected at the exit side of the reaction chamber as a slurry in water or in aqueous acetonitrile.

The rate of reaction depends on the temperature of the heated chamber, and the concentration of the solvent used. Under preferred operating conditions, about 16 parts of the biurea is slurried in 100 parts of approximately 50–75% by weight of acetonitrile in water, with a 5 to 15% excess of nitric acid. The reaction proceeds to about 90 to 95% yield of high purity, as the slurry is fed into the reactor, at a rate of about 90 to 150 grams per minute with a jacket temperature of from about 80 to 90° C. for a 1 square foot reactor. The acetonitrile forms an azeotropic mixture with water and boils at 85° C.

Certain specific examples are shown below, in which parts are by weight, and temperatures in ° C. unless otherwise clearly stated.

EXAMPLE 1

1,1'-azobis (N-n-butylformamide)

A well stirred mixture of 2.1 lbs. (0.0091 moles) 1,6-di-(n-butyl)biurea (DBB), 8.7 lbs. of acetonitrile, 3.7 lbs. of water and 0.75 lb. (0.00835 mole) of 70% nitric acid were pumped through a Rototherm E (1 square foot heat transfer area) at the rate of 15 lbs. of DBB/hr. at a temperature of 80±2° C. The reaction slurry was filtered to isolate the product which was then washed with water and dried. The dried product weighed 1.89 lbs. This is 91% of the theoretical yield calculated on the biurea feedstock.

EXAMPLE 2

Preparation of Azobisformamide, H$_2$N—C(=O)—N=N—C(=O)—NH$_2$

A thin-film rotary evaporator (0.25 square foot) was heated to 125° C. by circulating heated ethylene glycol through the jacket. A mixture containing 76.0 grams (0.644 mole) of biurea, 110 ml. acetonitrile, 90 ml. water and 38.6 grams of 70% nitric acid was charged to a holding flask attached to the evaporator. The slurry was fed into the heated reaction chamber at approximately 7 grams per minute and the product recovered at the exit port. After being filtered, washed with water and dried, azobisformamide was obtained in 84.4% yield. The acetonitrile was recovered by distillation during the reaction.

EXAMPLE 3

Batchwise preparation of azobisformamide

To a stirred mixture of 70.8 grams (0.6 mole) of biurea in 360 ml. acetonitrile was added 26.2 grams of 70% nitric acid over a period of 45 minutes. The mixture was gradually heated during this period to 55° C. to effect oxidation. The mixture was then heated to reflux for 1 hour then allowed to cool. The batch mixture obtained as a slurry was filtered, washed and dried, yielding 58 grams (83.2% of theory) of azobisformamide.

EXAMPLE 4

1,1'-azobis(N-ethylformamide)

A mixture of 26.4 grams of 1,6-diethylbiurea (0.15 mole), 7.0 ml. of concentrated nitric acid and 184 ml. of 55% acetonitrile (by vol.) was passed through a Rototherm (laboratory model 0.25 square feet) at the rate of 8 grams of mixture per minute. The jacket temperature was held at 125° C. The product was isolated from the cooled slurry by filtration, then washed with water, and dried. The yield was 5.7 grams, 22.1% of theoretical, of 1,1'-azobis(N-ethylformamide).

Obviously, variations can be used in the practice of the present invention. For instance the slurry of the biurea can be formed in situ by adding at least part of the dry or wet solid biurea being used to the mixture of liquid fatty acid nitrile and nitric acid, using precautions against thermal runaway. Also the less fatty acid nitrile in the final reaction mixture, the lower the solubility of the product, and the less loss on isolation. In continuous operation, said nitrile comes off in the reactor. In batch operations, part may be taken off in the overhead before isolation of the product.

I claim:
1. A process of oxidizing a biurea having the formula

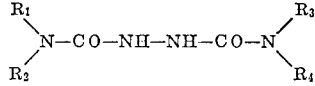

to produce the corresponding azobisformamide having the formula

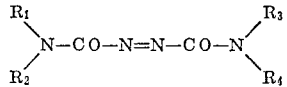

in which R$_1$, R$_2$, R$_3$ and R$_4$ are selected from the group consisting of hydrogen, alkyl of 1 to 12 carbon atoms, mono- and dicarbocyclic aryl and substituted aryl, cycloalkyl, aralkyl, alkoxyalkyl, cyanoalkyl, haloalkyl, nitroalkyl, alkenyl, which comprises: forming a slurry of said biurea in a liquid fatty acid nitrile having from 2 to 5 carbon atoms, and having present not more than 70% water by weight, in the presence of a stoichiometric excess of nitric acid, and heating said slurry at an oxidizing temperature until said biurea is substantially oxidized to said corresponding azo compound.

2. The process of claim 1 wherein said biurea is slurried in an aqueous actonitrile, in which the acetonitrile is at least 30% by weight of the combined weight of acetonitrile and water.

3. The process of claim 2 wherein $R_2$ and $R_4$ are hydrogen.

4. The process of claim 3 wherein the biurea is 1,6-di-n-butylbiurea.

5. The process of claim 3 in which $R_1$ and $R_3$ are identical and are hydrogen or an alkyl group of 1 to 12 carbon atoms, and said aqueous acetonitrile contains from about 50 to about 75 by weight of acetonitrile, and to the slurry is added from about 5% to about 15% excess of concentrated nitric acid over the amount required to oxidize said biurea, heating the slurry to a temperature sufficient to convert said biurea to the correpsonding azobisformamide, and removing acetonitrile from the reaction mixture simultaneously by distillation.

6. Claim 5 wherein the biurea is 1,6-di(n-butyl) biurea.

References Cited

UNITED STATES PATENTS

| 3,017,406 | 1/1962 | Mehr | 260—192 |
| 3,192,196 | 6/1965 | Vidal et al. | 260—192 |

CHARLES B. PARKER, Primary Examiner

C. F. WARREN, Assistant Examiner